US008301565B2

(12) United States Patent
Cantley et al.

(10) Patent No.: US 8,301,565 B2
(45) Date of Patent: Oct. 30, 2012

(54) SYSTEM AND METHOD FOR CORRESPONDENT BANK CUSTOMER ATM TRANSACTION PROCESSING

(75) Inventors: Kerry Cantley, Fort Mill, SC (US); Tony England, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 12/759,342

(22) Filed: Apr. 13, 2010

(65) Prior Publication Data
US 2011/0251956 A1 Oct. 13, 2011

(51) Int. Cl.
*G06Q 40/00* (2012.01)
(52) U.S. Cl. ............................................. 705/43; 705/35
(58) Field of Classification Search .................... 705/35, 705/43; 902/8, 9
See application file for complete search history.

(56) References Cited

U.S. PATENT DOCUMENTS

| 3,778,595 | A | * | 12/1973 | Hatanaka et al. | 235/379 |
|---|---|---|---|---|---|
| 5,453,601 | A | * | 9/1995 | Rosen | 705/65 |
| 5,848,400 | A | * | 12/1998 | Chang | 705/35 |
| 6,076,074 | A | * | 6/2000 | Cotton et al. | 705/40 |
| 6,122,625 | A | * | 9/2000 | Rosen | 705/65 |
| 7,181,430 | B1 | * | 2/2007 | Buchanan et al. | 705/45 |
| 7,216,106 | B1 | * | 5/2007 | Buchanan et al. | 705/45 |
| 7,386,511 | B2 | * | 6/2008 | Buchanan et al. | 705/45 |
| 7,440,924 | B2 | * | 10/2008 | Buchanan et al. | 705/45 |
| 7,624,071 | B2 | * | 11/2009 | Buchanan et al. | 705/45 |
| 7,792,753 | B1 | * | 9/2010 | Slater et al. | 705/45 |
| 7,873,200 | B1 | * | 1/2011 | Oakes et al. | 382/137 |
| 7,885,451 | B1 | * | 2/2011 | Walls et al. | 382/137 |
| 7,885,880 | B1 | * | 2/2011 | Prasad et al. | 705/35 |
| 7,962,411 | B1 | * | 6/2011 | Prasad et al. | 705/45 |
| 7,970,677 | B1 | * | 6/2011 | Oakes et al. | 705/35 |
| 8,025,213 | B2 | * | 9/2011 | Hartfield et al. | 235/379 |
| 8,027,928 | B1 | * | 9/2011 | Hecht et al. | 705/64 |
| 8,060,442 | B1 | * | 11/2011 | Hecht et al. | 705/45 |
| 2001/0034682 | A1 | * | 10/2001 | Knight et al. | 705/35 |
| 2002/0038289 | A1 | * | 3/2002 | Lawlor et al. | 705/42 |
| 2002/0072942 | A1 | * | 6/2002 | Kuykendall et al. | 705/7 |
| 2002/0082994 | A1 | * | 6/2002 | Herziger | 705/43 |

(Continued)

OTHER PUBLICATIONS

Patricia Murphy, It's a Time of Change for Check Processing, May 2004, USBanker, pp. 1-5.*

*Primary Examiner* — Kenneth Bartley
(74) *Attorney, Agent, or Firm* — Michael A. Springs; Moore & Van Allen PLLC; Patrick B. Horne

(57) ABSTRACT

Systems and methods provide the customer of a correspondent bank, having a pre-arranged relationship with an ATM bank to use the ATM bank's ATM network, with the opportunity to deposit funds via check or cash using the ATM bank's ATM network. A correspondent bank profile and/or individual customer profiles are created and stored on the ATMs of the ATM bank and/or the backend system. The correspondent bank customer initiates a transaction with an ATM on the ATM network, is authenticated, and the ATM determines the customer is a customer of the correspondent bank. Based thereon, the ATM offers the customer the option to perform a deposit transaction. The ATM bank clears the deposited funds and sends transaction information to the correspondent bank including MICR data, check image, and transaction information. The transaction is settled through a demand deposit account owned by the correspondent bank and maintained by the ATM bank.

39 Claims, 6 Drawing Sheets

U.S. PATENT DOCUMENTS

| | | | |
|---|---|---|---|
| 2002/0128969 A1* | 9/2002 | Parmelee et al. | 705/42 |
| 2003/0066876 A1* | 4/2003 | Goldman et al. | 235/379 |
| 2003/0217005 A1* | 11/2003 | Drummond et al. | 705/43 |
| 2004/0133516 A1* | 7/2004 | Buchanan et al. | 705/42 |
| 2005/0049950 A1* | 3/2005 | Johnson | 705/35 |
| 2005/0071283 A1* | 3/2005 | Randle et al. | 705/75 |
| 2006/0080245 A1* | 4/2006 | Bahl et al. | 705/40 |
| 2006/0106717 A1* | 5/2006 | Randle et al. | 705/45 |
| 2006/0182331 A1* | 8/2006 | Gilson et al. | 382/137 |
| 2006/0212391 A1* | 9/2006 | Norman et al. | 705/40 |
| 2007/0045395 A1* | 3/2007 | Corona et al. | 235/379 |
| 2007/0100750 A1* | 5/2007 | Hartfield et al. | 705/43 |
| 2007/0124241 A1* | 5/2007 | Newton | 705/39 |
| 2007/0288382 A1* | 12/2007 | Narayanan et al. | 705/45 |
| 2008/0086420 A1* | 4/2008 | Gilder et al. | 705/44 |
| 2008/0086421 A1* | 4/2008 | Gilder et al. | 705/44 |
| 2008/0116257 A1* | 5/2008 | Fickling | 235/379 |
| 2008/0249931 A1* | 10/2008 | Gilder et al. | 705/39 |
| 2008/0294514 A1* | 11/2008 | Calman | 705/14 |
| 2009/0008442 A1* | 1/2009 | Buchanan et al. | 235/379 |
| 2009/0018958 A1* | 1/2009 | Aveyard et al. | 705/43 |
| 2009/0094148 A1* | 4/2009 | Gilder et al. | 705/35 |
| 2009/0141962 A1* | 6/2009 | Borgia et al. | 382/139 |
| 2009/0309694 A1* | 12/2009 | Nichols et al. | 340/5.7 |
| 2010/0070415 A1* | 3/2010 | Buchanan et al. | 705/45 |
| 2010/0161466 A1* | 6/2010 | Gilder | 705/34 |
| 2010/0306111 A1* | 12/2010 | Slater et al. | 705/45 |
| 2011/0276483 A1* | 11/2011 | Saegert et al. | 705/43 |

* cited by examiner

SYSTEM AND METHOD FOR CORRESPONDENT BANK CUSTOMER ATM TRANSACTION PROCESSING

FIELD

In general, embodiments of the invention relate to ATM transaction processing, and, more particularly, relate to providing ATM transaction capabilities to a customer of a correspondent bank having a pre-established relationship with the ATM bank maintaining the ATM network.

BACKGROUND

Automated teller machines (ATMs) are computerized telecommunications devices providing customers of a financial institution such as a bank access to financial transactions involving accounts owned by the customers and maintained by the bank. ATMs are part of an ATM infrastructure of numerous ATMs maintained by many different banks and connected to the many banks through an ATM network. This allows customers of the many different banks to use ATMs owned and maintained by entities other than the bank maintaining their account(s) and potentially outside their particular bank's geographic footprint. ATMs provide a customer access to account information and the ability to withdraw funds on demand from the customer's account. Additionally, customers are able to perform additional types of transactions when using an ATM owned by the same bank that maintains the customer's account. Such additional transaction types include submitting a deposit, such as a check with the customer as payee. Typically, a check deposit is processed by the ATM and the amount of the check is credited to the customer's account. However, a customer of a bank other than the bank that owns or maintains the ATM cannot access transactions such as deposits.

Therefore, systems and methods are needed to provide the customer of a correspondent bank, having a pre-arranged relationship with an ATM bank to use the ATM bank's ATM network, with the opportunity to deposit funds via check or cash using the ATM bank's ATM network.

SUMMARY

Systems and methods provide the customer of a correspondent bank, having a pre-arranged relationship with an ATM bank to use the ATM bank's ATM network, with the opportunity to deposit funds via check or cash using the ATM bank's ATM network. The ATM bank clears the deposited debits through its pre-established exchange networks at relatively low cost and using a pre-existing image processing capability, and then sends the transaction information to the correspondent bank and appropriately settles the transactions.

According to embodiments of the present invention, a method for providing a customer of a correspondent bank one or more correspondent relationship transactions at an automated teller machine (ATM) of an ATM bank having a pre-existing relationship with the correspondent bank defining the correspondent bank's customer as pre-approved for performing correspondent relationship transactions at the ATM of the ATM bank is provided. The method includes verifying a user as a customer of the correspondent bank and thereby approving the customer for performing correspondent relationship transactions; and performing one or more correspondent relationship transactions with the customer.

In some embodiments, the method includes communicating transaction information corresponding to the one or more performed correspondent relationship transactions to the correspondent bank. In some embodiments, the one or more correspondent relationship transactions includes a deposit transaction. In some such embodiments, the deposit transaction includes processing a check deposit. In some such embodiments, the method includes storing a correspondent bank profile comprising information regarding the correspondent bank, and in some such embodiments, the verifying the user includes retrieving the information from the correspondent bank profile and comparing customer information with information retrieved from the correspondent bank profile. In some such embodiments, the customer information is provided to the ATM by a customer's bank card.

In some embodiments, the method includes storing an individual customer profile comprising information regarding the correspondent bank. In some such embodiments, verifying the user includes retrieving the information from the individual customer profile and comparing customer information with information retrieved from the individual customer profile. In some such embodiments, the customer information is provided to the ATM by a customer's bank card.

In some embodiments, the method includes validating the check to determine whether the check is an acceptable deposit. In some such embodiments, the method includes storing transaction information corresponding to the check and the correspondent relationship transaction. In some such embodiments, the transaction information comprises one or both of image data and magnetic ink character recognition (MICR) data, and in some such embodiments, the transaction information includes one or more of transaction time, transaction date, transaction location. In some embodiments, the method includes validating the magnetic ink character recognition (MICR) data from the check at a backend system of the ATM bank.

In some embodiments, the method includes creating a transaction record based at least in part on transaction information related to the correspondent relationship transaction. In some such embodiments, the method includes decorating the transaction record with additional information related to the transaction. In some such embodiments, creating the transaction record includes creating a plurality of transaction records related to a plurality of correspondent relationship transactions, and the method includes collecting any transaction records conforming to one or more sweep criteria; building a correspondent bank transaction file; and delivering the correspondent bank transaction file to the correspondent bank. In some such embodiments, the correspondent bank transaction file includes one or more appended image data file corresponding to one or more checks deposited by one or more correspondent bank customers. In some such embodiments, the method includes charging a correspondent bank demand deposit account a correspondent relationship transaction fee based at least in part on the collected transaction records.

In some embodiments, the customer is the correspondent bank.

According to embodiments of the present invention, a computer program product for providing a customer of a correspondent bank one or more correspondent relationship transactions at an automated teller machine (ATM) of an ATM bank having a pre-existing relationship with the correspondent bank defining the correspondent bank's customer as pre-approved for performing correspondent relationship transactions at the ATM of the ATM bank is provided. The computer program product includes a non-transitory computer readable memory including computer-executable instructions. The computer-executable instructions include instructions for verifying a user as a customer of the correspondent bank and thereby approving the customer for performing correspondent relationship transactions; and instructions for performing one or more correspondent relationship transactions with the customer.

In some embodiments, the instructions also include communicating transaction information corresponding to the one or more performed correspondent relationship transactions to the correspondent bank, and in some embodiments, the one or more correspondent relationship transactions comprises a deposit transaction comprising processing the deposited check. In some embodiments, the instructions include storing a correspondent bank profile comprising information regarding the correspondent bank. In some embodiments, the instructions for verifying include instructions for retrieving the information from the correspondent bank profile and instructions for comparing customer information with information retrieved from the correspondent bank profile. In some such embodiments, the instructions also include instructions for validating the check to determine whether the check is an acceptable deposit. In some embodiments, the instructions include instructions for storing transaction information corresponding to the check and the correspondent relationship transaction, and in some embodiments, the instructions include instructions for validating the magnetic ink character recognition (MICR) data from the check at a backend system of the ATM bank.

In some embodiments, the instructions include instructions for creating a transaction record based at least in part on transaction information related to the correspondent relationship transaction. In some such embodiments, the instructions include instructions for decorating the transaction record with additional information related to the transaction. In some such embodiments, the instructions include instructions for creating a plurality of transaction records related to a plurality of correspondent relationship transactions; instructions for collecting any transaction records conforming to one or more sweep criteria; instructions for building a correspondent bank transaction file; and instructions for delivering the correspondent bank transaction file to the correspondent bank. In some such embodiments, the correspondent bank transaction file includes one or more appended image data files corresponding to one or more checks deposited by one or more correspondent bank customers, and in some such embodiments, the instructions also include instructions for charging a correspondent bank demand deposit account a correspondent relationship transaction fee based at least in part on the collected transaction records.

According to embodiments of the present invention, a system for providing a customer of a correspondent bank one or more correspondent relationship transactions at an automated teller machine (ATM) of an ATM bank having a pre-existing relationship with the correspondent bank defining the correspondent bank's customer as pre-approved for performing correspondent relationship transactions at the ATM of the ATM bank is provided. The system includes means for verifying a user as a customer of the correspondent bank and thereby approving the customer for performing correspondent relationship transactions; and means for performing one or more correspondent relationship transactions with the customer. In some embodiments, the system includes means for storing a correspondent bank profile comprising information regarding the correspondent bank. In some such embodiments, the system includes means for retrieving the information from the correspondent bank profile and means for comparing customer information with information retrieved from the correspondent bank profile. In some embodiments, the correspondent relationship transaction comprises processing a check deposit, and wherein the system further comprises means for validating the check to determine whether the check is an acceptable deposit. In some embodiments, the system includes means for creating a transaction record based at least in part on transaction information related to the correspondent relationship transaction. In some such embodiments, the system includes means for decorating the transaction record with additional information related to the transaction. In some embodiments, the system includes means for creating a plurality of transaction records related to a plurality of correspondent relationship transactions; means for collecting any transaction records conforming to one or more sweep criteria; means for building a correspondent bank transaction file; and means for delivering the correspondent bank transaction file to the correspondent bank.

According to embodiments of the present invention, a system is provided including an automated teller machine (ATM) configured for providing a customer of a correspondent bank one or more correspondent relationship transactions, the ATM maintained by an ATM bank having a pre-existing relationship with the correspondent bank defining the correspondent bank's customer as pre-approved for performing correspondent relationship transactions at the ATM of the ATM bank. The ATM is further configured for verifying a user as a customer of the correspondent bank and thereby approving the customer for performing correspondent relationship transactions; and performing one or more correspondent relationship transactions with the customer. In some embodiments, the system includes a backend system disposed remotely from the ATM and connected with the ATM across an ATM network and configured for storing a correspondent bank profile comprising information regarding the correspondent bank. In some embodiments, the ATM is further configured for retrieving the information from the correspondent bank profile and comparing customer information with information retrieved from the correspondent bank profile.

In some embodiments, the correspondent relationship transaction comprises processing a check deposit, and the backend system is further configured for validating the check to determine whether the check is an acceptable deposit. In some embodiments, the backend system is further configured for creating a transaction record based at least in part on transaction information related to the correspondent relationship transaction. In some such embodiments, the backend system is further configured for decorating the transaction record with additional information related to the transaction. In some embodiments, the backend system is further configured for creating a plurality of transaction records related to a plurality of correspondent relationship transactions; collecting any transaction records conforming to one or more sweep criteria; building a correspondent bank transaction file; and delivering the correspondent bank transaction file to the correspondent bank.

In some embodiments of the system, the customer is the correspondent bank.

BRIEF DESCRIPTION OF THE DRAWINGS

Figure 1:
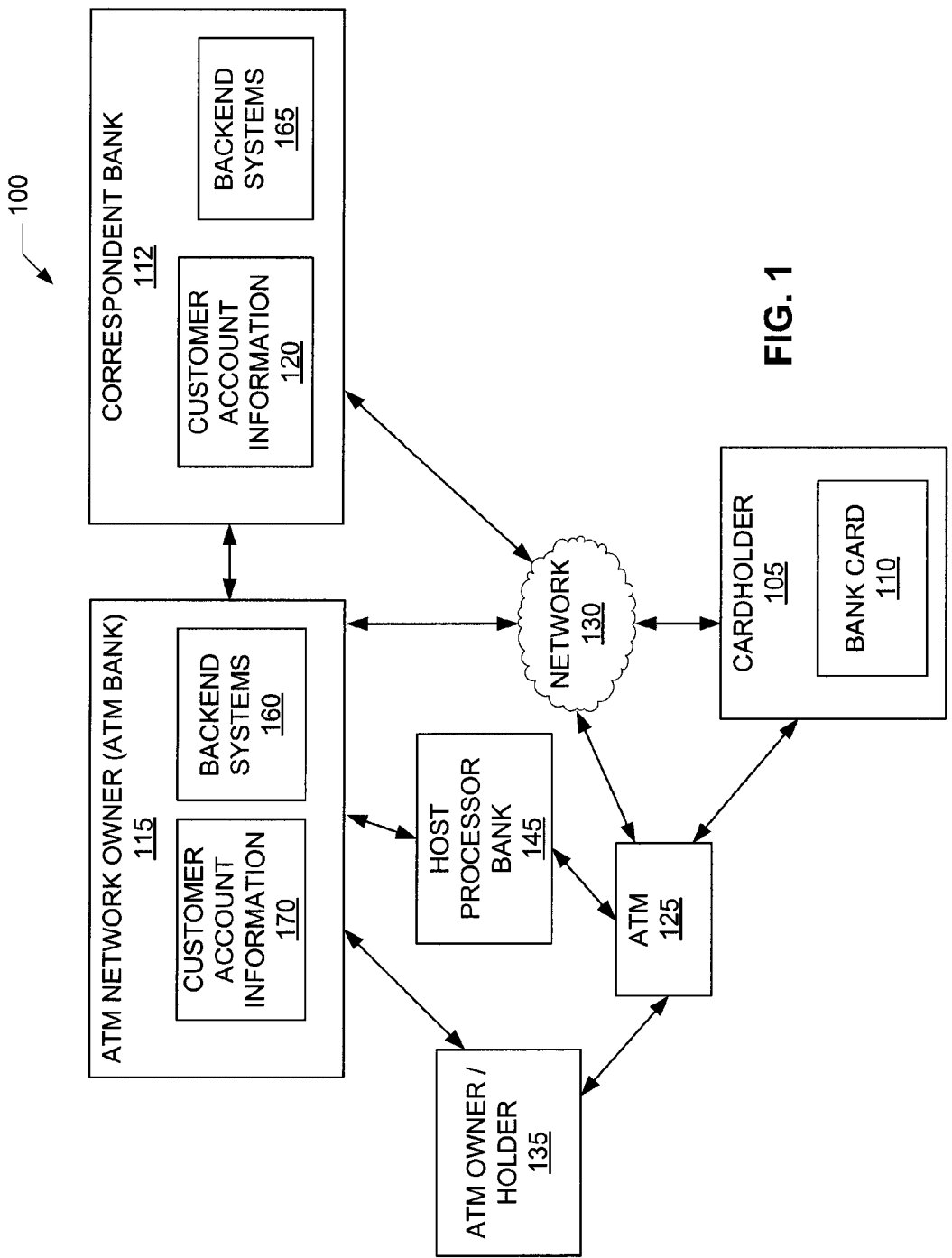
Figure 2:
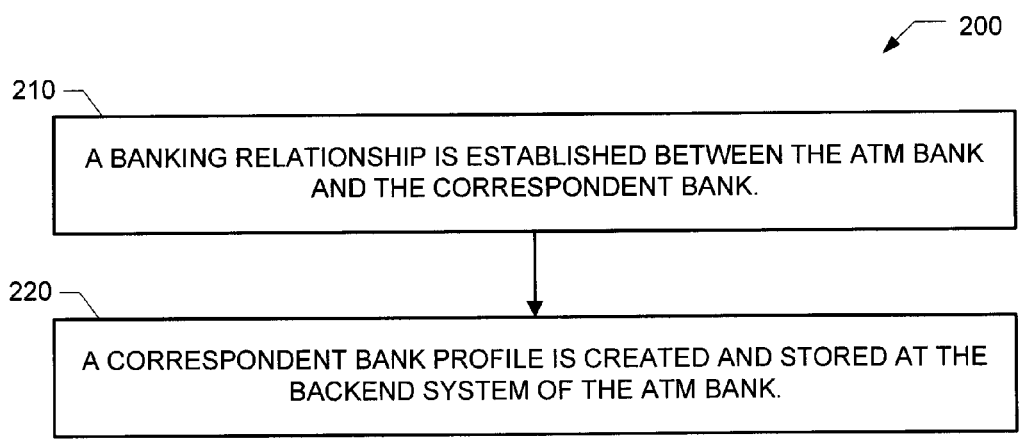
Figure 3:
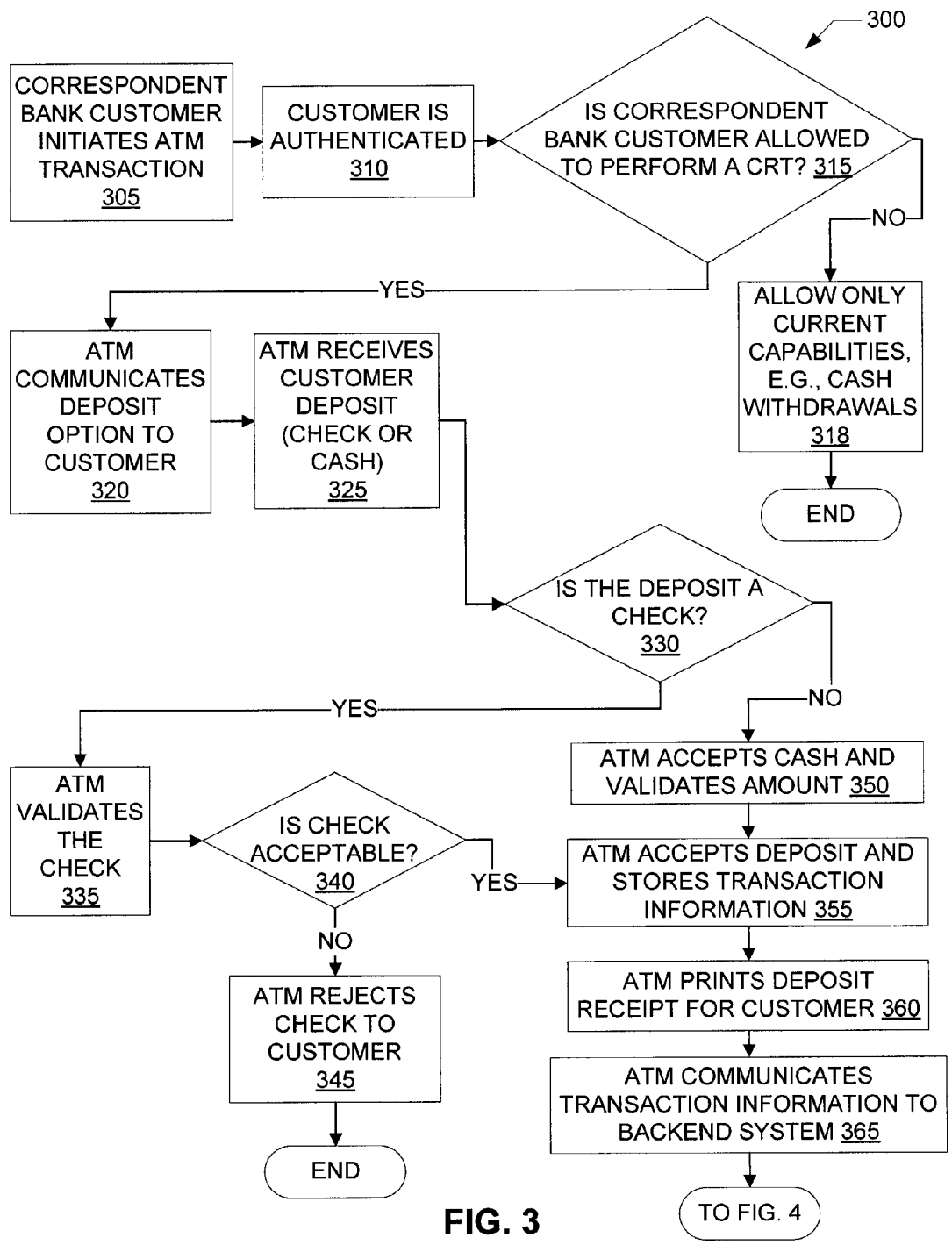
Figure 4:
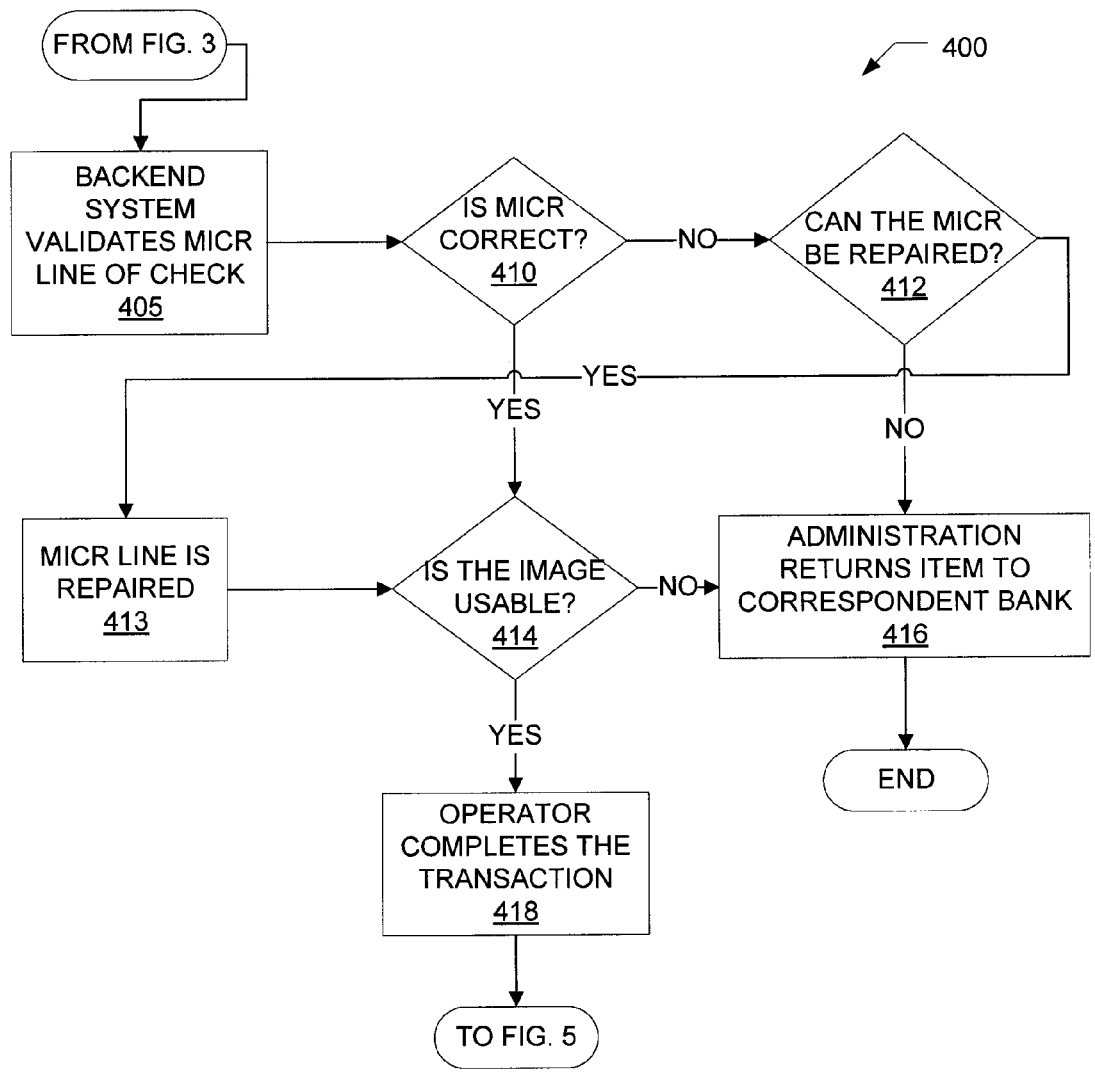
Figure 5:
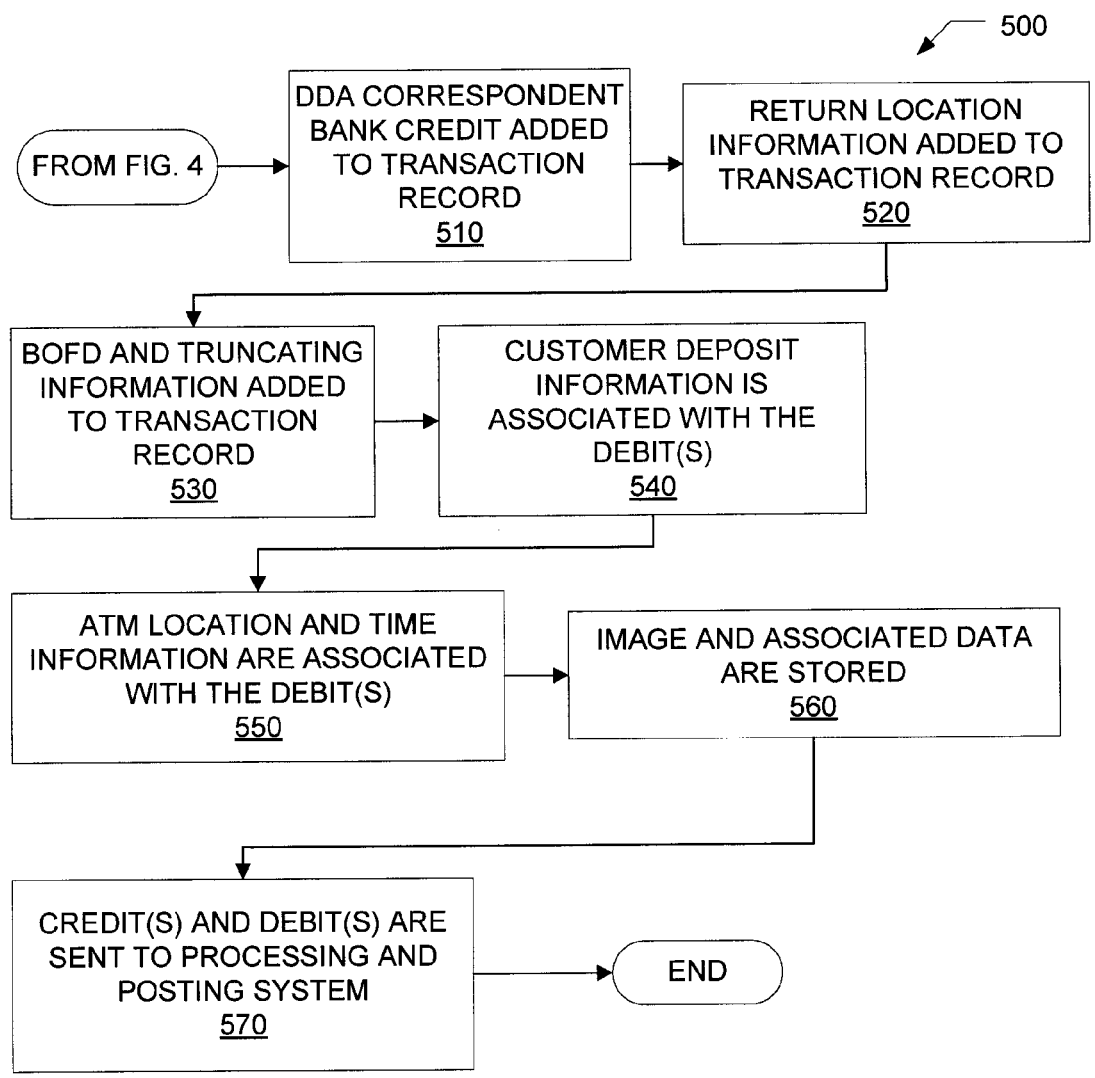
Figure 6:
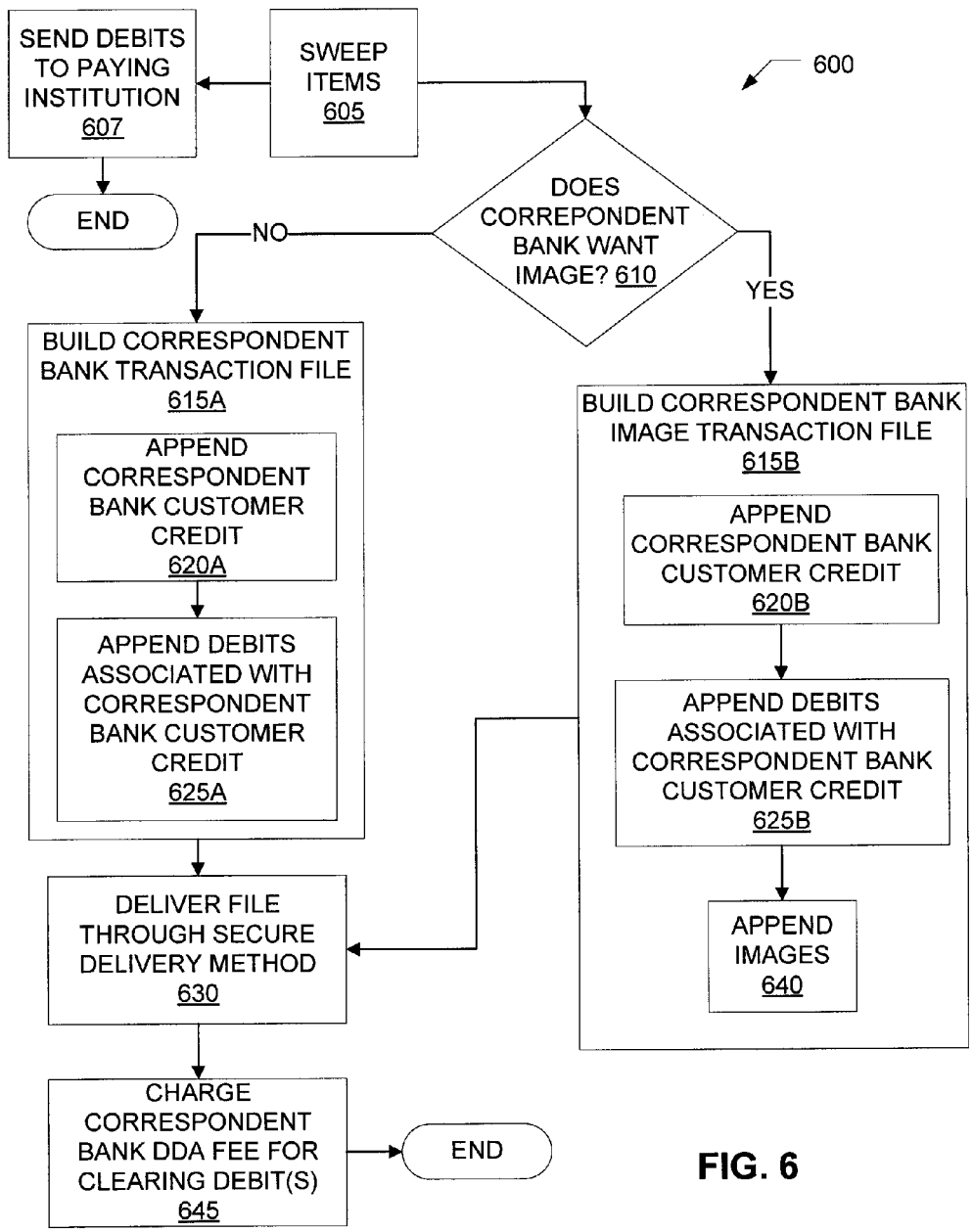

Having thus described embodiments of the invention in general terms, reference will now be made to the accompanying drawings, which are not necessarily drawn to scale, and wherein:

FIG. 1 is a block diagram illustrating an ATM system according to one embodiment of the present invention;

FIG. 2 is a flowchart illustrating a set-up process according to one embodiment of the present invention;

FIG. 3 is a flowchart illustrating a deposit process according to one embodiment of the present invention;

FIG. 4 is a flowchart illustrating a back-office process according to one embodiment of the present invention;

FIG. 5 is a flowchart illustrating an automated process according to one embodiment of the present invention; and FIG. 6 is a flowchart illustrating a sweep process according to one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide systems and methods for providing the customer of a correspondent bank, having a pre-arranged relationship with an ATM bank to use the ATM bank's ATM network, with the opportunity to deposit funds via check or cash using the ATM bank's ATM network. The ATM bank clears the deposited debits through its pre-established exchange networks at relatively low cost and using a pre-existing image processing capability, and then sends the transaction information to the correspondent bank and appropriately settles the transactions.

FIG. 1 is a block diagram illustrating one embodiment of an automated teller machine (ATM) system 100. The system 100 generally involves a cardholder 105 holding a bank card 110 issued by a correspondent bank 112. In various embodiments, the bank card 110 is, for example, a credit, debit, ATM or other type of card including a magnetic stripe, or a smart card or chip card including an electronic device embedded in or on the card.

It should be appreciated that, although embodiments of the present invention are generally described herein with reference to "bank cards" and "cardholders", other embodiments of the invention involve use of other payment devices, such as smart phones, near-field communication (NFC) devices, RFID tags, biometric devices, and the like in lieu of the "cards" described herein. The bank card 110 (or other payment device) is used during a transaction involving one or more accounts associated with the bank card 110 and maintained by the correspondent bank 112. Accordingly, the bank card is typically issued by the correspondent bank. In a typical bank card transaction, the cardholder 105 is the customer who owns the account maintained by the correspondent bank 112. However, in other bank card transactions or attempted bank card transactions, the cardholder 105 is not the customer. For example, the customer may authorize a friend or family member to perform a transaction with the bank card 110, in which case the friend or family member is considered the "cardholder" for purposes herein.

The ATM network owner 115 (also referred to herein as the "ATM bank") is typically the bank or other financial institution that maintains the ATM 125 and the network 130. However, in the present configuration, the correspondent bank 112 is typically the financial institution that issues the bank card 110. In this regard, the correspondent bank 112 includes a memory system housing a datastore of customer account information 120. The memory system housing the customer account information is typically part of or in communication with one or more backend systems 165 maintained by the correspondent bank 112. A "backend system" is one or more computers or computer-like devices such as one or more server systems, and a backend system typically has one or more processing devices such as a server and typically includes one or more memory devices as well as one or more communication devices. The customer account information 120 generally includes an account number, an account balance, transaction information about previous transactions, and/or other financial and non-financial information about the customer and the customer's account.

The ATM bank 115 also has backend systems 160 for processing ATM transactions and a memory system housing a datastore of customer account information 170 similar to the datastore of customer account information 120 maintained by the correspondent bank 112. The memory system housing the customer account information 170 is typically part of or in communication with one or more backend systems 160 maintained by the ATM bank 115. The customer account information 170, as discussed in greater detail below, houses profiles of both ATM bank customers and correspondent bank customers. Many or all correspondent bank customer profiles are established at the inception of a relationship between the ATM bank 115 and the correspondent bank 112. Additional correspondent bank customers desiring to have access to the ATM network through the ATM bank 115 can establish profiles with the ATM bank 115 subsequent to the inception of the relationship between the ATM bank 115 and the correspondent bank 112. In some embodiments such profiles are established at the customer's initiative, and in some embodiments, such profiles are established at the correspondent bank's and/or the ATM bank's initiative. In some embodiments, the customers must receive pre-approval from one or both of the ATM bank and the correspondent bank before establishing a profile on the ATM bank's customer account information 170 datastore. Such pre-approval may be necessary in order that particular pre-arranged fee structures can be initiated with regard to the particular customer's account. For example, in one embodiment, the customer must attain pre-approval from the correspondent bank before establishing a profile so that the correspondent bank can associate with the customer's account in its customer account information 120 datastore, proper fee arrangements for using the ATM bank's ATM network. This provides streamlining of fee payment to the ATM bank upon the customer's use of the ATM bank's ATM network.

The system 100 includes an ATM 125 configured to communicate with the ATM bank 115. In some instances, the ATM 125 communicates through the network 130 directly with the correspondent bank 112. In other embodiments, the ATM 125 communicates with the ATM bank 115 through an ATM owner/holder 135 and/or a host processor bank 145. The ATM 125 is owned, held, or otherwise associated with the ATM owner/holder 135. In one embodiment, the ATM owner/holder 135 is the ATM bank 115. For example, many banks have their own ATMs. In such an embodiment, the ATM 125 communicates directly with the ATM bank 115 over the ATM network 130 or through one or more other entities. In other embodiments, however, the ATM owner/holder 135, is another bank or financial institution, a merchant, or the like. In such embodiments, the ATM 125 communicates with the ATM bank 115 through the ATM owner/holder 135. In some such embodiments, although an ATM owner/holder 135 has some type of ownership interest in one or more ATMs 125, the ATM bank 115 maintains the ATM and processes the various transactions initiated at the ATM 125.

In one example, the ATM 125 is a kiosk-style ATM owned or leased by a merchant from the ATM bank 115. The merchant, in some embodiments, for example, is a gas station or convenience store. In some embodiments, although the ATM owner/holder (the "merchant" in this example) 135 typically provides the money in the ATM 125, the ATM 125 is operated by a host processor bank 145. In such an embodiment, the ATM 125 communicates with the ATM bank 115 through the host processor bank 145. Where the transaction involves a withdrawal of cash from the ATM 125, the ATM bank 115 transfers funds to the host processor bank 145 via, for example, an electronic funds transfer, and the host processor bank 145 then transfers the funds via the Automated Clearing House (ACH) to the merchant's bank account maintained by the merchant's bank (not shown). In this way, the ATM owner/holder 135 is reimbursed for the funds dispensed at the ATM 125.

As used herein the term "ATM network" refers to the ATM infrastructure, including one or more ATMs 125 maintained and processed by the ATM bank 115, many or all of which are owned by the ATM bank 115, but some of which, in some embodiments, are owned and/or leased by one or more ATM owner/holders 135, and some of which are operated by a host processor bank 145 in communication with the ATM bank 115.

Referring now to FIG. 2, a flowchart illustrating a set up process 200 is shown. In step 210, a banking relationship is established between the ATM bank and the correspondent bank. The relationship, in some embodiments, is a contractual relationship whereby the ATM bank allows the correspondent bank and its customers access to use the ATM bank's ATM network. Further, the relationship typically provides for the correspondent bank to pay one or more fees to the ATM bank for its customers to use the ATM network. In some arrangements, the fees are based in part on the services provided by the ATM bank to the correspondent bank and its customers. For example, in one embodiment, the ATM bank provides image exchange capabilities to the correspondent bank such that the correspondent bank will receive images of the correspondent bank's customers depositing checks using the ATM network. In some embodiments, this image exchange capability is provided as per usage fee and in other embodiments, the image exchange capability is provided on a flat fee basis. In another embodiment, for example, the services provided for by the relationship include the ATM bank clearing of deposits so that the correspondent bank need not do so. Such an arrangement may be particularly beneficial in a situation where a correspondent bank loses or plans to lose a pre-existing clearing point in a particular market, and the ATM bank can take on clearing for the correspondent bank is that market.

In step 220, a correspondent bank profile is created and stored in the backend system 160 of the ATM bank 115. The correspondent bank profile, in some embodiments includes one or more individual customer profiles, and in other embodiments, the individual customer profiles are not part of a correspondent bank profile, but rather, are created and stored separately. In some embodiments, the correspondent bank profile and/or the one or more individual customer profiles are stored along with the customer account information 170 on its datastore. In some embodiments, the correspondent bank profile includes various pieces of information about the correspondent bank. For example, in one embodiment, the correspondent bank profile includes a unique correspondent bank identification number, a unique correspondent bank routing number, and information regarding authorization for the correspondent bank's customers when attempting an ATM transaction. The latter includes, in some embodiments, personal identification numbers (PINs), or other authentication information, associated with specific accounts owned by one or more customers used in authenticating the cardholder as the account owner or customer at the onset of an ATM transaction. In some embodiments, the individual customer profiles includes the same or different information than the correspondent bank profile, and in some embodiments, there is no correspondent bank profile, but rather, just individual customer profiles. In some embodiments, some or all of the information contained in the correspondent bank profile and/or the individual customer profiles are downloaded to the ATM network, and in some embodiments, to the individual ATMs intended for providing access to the correspondent bank's customers. This configuration allows the individual ATM to perform an "offline authentication," thereby authenticating the cardholder as the account owner locally at the ATM. An "online authentication," on the other hand, typically requires authentication processed by the backend system of the ATM bank. In various embodiments, one or both offline and online authentication are used to authenticate the cardholder as the customer.

In one embodiment, for example, the customer is issued an ATM card from the correspondent bank, which has a contractual relationship with the ATM bank to use the ATM bank's ATM network. The cardholder initiates a transaction with an ATM on the ATM bank's ATM network, and the customer's information, being previously stored at the ATM being used, is retrieved based on the ATM card inserted into the ATM. The cardholder authenticates that the cardholder is the account owner or customer, and the ATM, based on the individual customer profile and/or the correspondent bank profile, that the customer is a customer of the correspondent bank. Based on one or more of the profiles, the ATM enables specific functionality that otherwise may have been disabled, such as the ability to perform a deposit transaction, for example, depositing a check. In a case where the cardholder is not determined to be a customer either of the ATM bank or a correspondent bank having a relationship with the ATM bank, the cardholder is typically only allowed minimal transaction functionality, such as withdrawing cash from the cardholder's account.

In some embodiments, a correspondent bank demand deposit account (DDA) is established during the set-up process and linked with the correspondent bank profile and/or the individual customer profiles. This correspondent bank DDA is used in the later stages of the ATM transaction process to settle the transaction, and in some, embodiments, the ATM bank retrieves fees in the form of debits from the DDA and the ATM bank deposits funds in the form of credits into the DDA as discussed in additional detail below.

Referring now to FIG. 3, a flowchart illustrating a deposit process 300 is shown. In step 305, the correspondent bank's customer initiates an ATM transaction at an ATM on the ATM bank's ATM network. The ATM authenticates the customer as the account owner by accessing one or more of the correspondent bank profiles and/or the individual customer profiles or otherwise authenticates the cardholder as the account owner by performing an online authentication with one or more backend banking system in step 310. Once the correspondent bank customer has been authenticated, a determination is made, at step 315, whether the customer is allowed to perform a correspondent relationship transaction such as making a deposit.

A "correspondent relationship transaction" (CRT) is one which is not typically included in the set of interactions or transactions typically available to a non-ATM bank customer using an ATM on the ATM bank ATM network, but which has been made available to correspondent bank customers based on the relationship established in step 210.

The determination of step 315 is made, in some embodiments, by a processing device of the ATM 125 itself, and, in other embodiments, a processing device located at the ATM bank or some other entity such as the host processor bank 145 or the ATM owner/holder 135. In some embodiments, the determination is made based at least in part on an examination of one or more correspondent bank profiles and/or individual customer profiles stored either at the ATM 125, the ATM bank 115 or the correspondent bank 112. In one embodiment, for example, upon reading the customer's ATM card, the ATM card's issuing bank routing transit number is determined. The processing device of the ATM or, in other embodiments, the ATM bank, or some other entity compares the routing transit number read from the ATM card to determine if the routing transit number matches one of the routing transit numbers stored in a correspondent bank profile and/or an individual customer profile thereby indicating the correspondent bank relationship between the ATM bank and the correspondent bank.

If the correspondent bank customer is not allowed to perform a CRT, the customer can proceed with one or more transactions typically available for non-ATM bank customers such as withdrawing cash (step 318), and thereafter the process 300 ends. However, if the correspondent bank customer is allowed to perform a CRT, the process continues at step 320. At step 320, the ATM 125 communicates an option to perform a deposit transaction to the correspondent bank customer. In some embodiments, the interaction between the correspondent bank customer and the ATM is similar with regard to the interface of the ATM to the interaction a customer of the ATM bank would experience. At step 325, the ATM receives the customer deposit either in the form of a check or cash. Once the customer has made the deposit, a determination is made by a processing device in the ATM whether the deposit is cash or check as represented by decision block 330. If the deposit is not a check, but cash, the ATM accepts the cash and determines the amount of cash deposited (step 350). In some embodiments, once the ATM has determined the amount of cash deposited (step 350), the ATM confirms the amount deposited with the customer. If the cash amount is not confirmed by the customer, in some embodiments, the ATM rejects the deposit back to the customer. If the deposit is confirmed, the ATM accepts the cash deposit and stores transaction information (step 355).

If the deposit is a check, the ATM validates the check (step 335). In validating the check (step 335), the ATM scans the check and creates at least two data files including an image of the check and a MICR data file. Magnetic ink character recognition (MICR) is a standard character recognition technology used to facilitate check processing by allowing a processing device to analyze scanned data to determine information such as the routing transit number, the account number and the like. The MICR data is typically computer readable unlike barcodes, which are only machine-readable. In most embodiments, the MICR standard uses alphanumeric characters printed from magnetic ink that is magnetized during reading. Once the check has been scanned and the data files are created, early fraud detection systems are polled to confirm the check is acceptable. This step protects against potential fraud, which, because the ATM bank is validating another bank's customer's check, may have an increased chance of occurrence. In various embodiments of the validation, different methods can be used for early fraud detection. For example, validation may be or include one or more of the following in various embodiments: routing transit number validation, account information such as account number validation, specific customer information validation, comprehensive check detail validation, comprehensive correspondent bank information validation and the like. In some embodiments, the ATM bank leverages as much early detection information and validation as possible in order to minimize the potentially increased risk of fraud.

At decision block 340, the ATM determines whether the check is acceptable. If the check is unacceptable, the ATM rejects the check to the customer (step 345) and the process 300 ends. If the check is acceptable, the ATM accepts the check as a deposit and stores transaction information related to the deposit (step 355). The transaction information includes, but is not limited to, in some embodiments, the image of the check and the MICR line data as well as associated deposit account information read from the ATM card such as the routing transit number, the account number, and the bank identification number. In some embodiments, some or all of the information used in the validation, step 335, is stored as transaction information. In step 360, the ATM prints a deposit receipt for the customer, and in step 365. The deposit receipt, in some embodiments, is printed before additional backend processing occurs. Finally, the ATM communicates the transaction information to one or more backend systems, such as systems 160 and/or 165.

Referring now to FIG. 4, a flowchart illustrating a back office process 400 is shown. The back office process is, in some embodiments, performed by one or more backend systems, such as systems 160 and/or 165. The backend systems 160 and 165 are or include, in some embodiments, one or more processing devices, one or more memory devices, and one or more communication devices connected in various configurations with one another. In some embodiments, the backend systems 160 and 165 are considered servers or other computing devices or combinations of computing devices. The first step of the back office process 400 is validation of the MICR line data. This includes comparison of the MICR line data determined by the ATM previously with the MICR line data read from the check at the backend system. Accordingly, potential errors initiated by the ATM reader and analyzer can be avoided or mitigated by this additional validation step. At decision block 410, a determination of whether the MICR line data is correct is made by the backend system. If the MICR line data is not correct, another decision is made whether the MICR line data can be repaired (decision block 412). The decision of step 412 is typically made by a person such as an operator. For example, in one embodiment, a damaged check may be missing some or all MICR data, and an operator makes a determination whether the MICR data can be repaired. The operator inputs the determination into the backend system, and an administrative entity, either automated or not, returns the item to the correspondent bank (step 416). At that point, the process 400 ends.

In some embodiments, if the MICR line data can be repaired (see step 412), an operator reads the missing or damaged data from the check and inputs the data into the system, which is referred to as repairing the MICR line data (step 413).

Referring back to decision block 410, if the MICR line data was correct or the MICR line has been repaired (step 413), the process 400 moves to decision block 414, at which a determination is made as to whether the image is usable. This step, in some embodiments, is performed by an operator, and in others is automatic. Various pieces of information are read from the check by the system to determine whether the check is usable. If the system determines the check is potentially unusable, then an operator, in some embodiments, verifies the check is unusable. If the system determines the check image is a good image, then, in some embodiments, an operator's opinion is not required. If the check is determined to be unusable, the administrative entity returns the item to the correspondent bank (step 416), and the process 400 ends. In some embodiments where the item is returned to the correspondent bank, the correspondent bank is tasked going forward with informing the customer of the unsuccessful deposit. If it is determined the image is usable, that is, the various pieces of information on the check image are readable, such as the name on the check, the handwritten amount, the recipient, and the like, the operator completes the transaction (step 418).

Referring now to FIG. 5, a flowchart illustrating an automated process 500 for providing a credit corresponding to the deposit is shown. In some embodiments, an image exchange standard is used in various steps of the process 500, such as ANSI standard DSTUX9.37-2003 or a similar standard. The automated process 500, in some embodiments, is performed by the backend system 160 and/or 165, and in some embodiments, some or all of the steps of process 500 are referred to as "decorating the transaction." In order to exchange the transaction or settle to the correspondent bank demand deposit account (DDA), transaction information must be processed and provided in a useable fashion to the correspondent bank. In step 510, a transaction record is created from the transaction information, and a correspondent bank DDA credit is added to the transaction record. Next, at step 520, return location information is added to the transaction record. In some embodiments, the return location information is retrieved from one or both of the correspondent bank profile and the individual customer profile. Next, at step 530, information regarding the bank of first deposit and truncating information are added to the transaction record. Next, the customer deposit information is associated with any debits (step 540), and the ATM location and time information as associated with the debits (step 550). Next, the image and associated data are included with the transaction record (step 560). Finally, the credit(s) and debit(s) are sent to a processing and posting system to be prepared for sending to the correspondent bank (step 570). For example, a credit or debit is posted to the DDA established and maintained by the ATM bank in the set-up process 200 for the corresponding bank. In another embodiment, for example, the transaction record includes the various pieces of information discussed with reference to process 500 as well as the MICR line data and the image file of the check. In addition, the various pieces of transaction information discussed above are included with the transaction record. In some embodiments, each transaction record includes a sequence number or a unique key which identifies the transaction record. As the transaction record proceeds through the backend system and various pieces of information are attached, the transaction record can easily be identified, retrieved, and supplemented as desired.

Referring now to FIG. 6, a flowchart illustrating a sweep process 600 is shown. The sweep process involves accumulating all the items associated with a transaction that has been processed, such as by processes 300, 400 and 500. The sweep process 600 clears the transit items and provides a comprehensive file or compilation of files for the correspondent bank. The sweep process 600, in some embodiments, is performed periodically or at certain times during a business day or week. In step 605, the various transaction information files and records are swept to determine which should be associated with a particular correspondent bank. Once those files and records are determined, the relevant debits and credits are sent to the paying institution as represented by block 607. For example, in one embodiment, a correspondent bank customer deposits a check at an ATM that is part of the ATM network of the ATM bank. The ATM bank has performed processes 300, 400 and 500, and now needs to be made whole or re-compensated for the any transaction expenses, which is achieved through step 607.

The system also determines whether the correspondent bank wants an image file or only the data associated with the transaction record (decision block 610). This determination, in some embodiments, is made by retrieving information from one or both of the correspondent bank profile and the individual customer profile. If the correspondent bank does not want the image file, a correspondent bank transaction file is built (step 615A). In the illustrated embodiment, the build includes two steps. First, the correspondent bank customer credit is appended to the correspondent bank transaction file (step 620A). Then, the debits associated with the correspondent bank customer credit are appended to the correspondent bank transaction file (step 625A).

In the case where the correspondent bank does want an image file, a correspondent bank image transaction file 615B is built. The build includes several steps in the illustrated embodiment. First, the correspondent bank customer credit is appended to the correspondent bank image transaction file (step 620B), and debits associated with the correspondent bank customer credit are appended to the correspondent bank image transaction file (step 625B). Finally, the images are appended to the correspondent bank image transaction file (step 640).

Once either the correspondent bank transaction file is created (steps 615A-625A) or the correspondent bank image transaction file is created (steps 615B-640B), the file is delivered through a secure delivery mode to the correspondent bank (step 630). Finally, the correspondent bank DDA is charged a fee from the ATM bank for processing and clearing the one or more debit(s) (step 645).

In some embodiments, the correspondent bank relationship with the ATM bank includes a scenario where the correspondent bank is seen as a customer to the system 100 of the ATM bank. For example, in one embodiment, the correspondent bank is issued an ATM card by the ATM bank and deposits its checks at an ATM maintained in the ATM network by the ATM bank.

In summary, systems and methods provide the customer of a correspondent bank, having a pre-arranged relationship with an ATM bank to use the ATM bank's ATM network, with the opportunity to deposit funds via check or cash using the ATM bank's ATM network. A correspondent bank profile and/or individual customer profiles are created and stored on the ATMs of the ATM bank and/or the backend system. The correspondent bank customer initiates a transaction with an ATM on the ATM network, is authenticated, and the ATM determines the customer is a customer of the correspondent bank. Based thereon, the ATM offers the customer the option to perform a deposit transaction. The ATM bank clears the deposited funds and sends transaction information to the correspondent bank including MICR data, check image, and transaction information. The transaction is settled through a demand deposit account owned by the correspondent bank and maintained by the ATM bank.

As used herein, unless specifically limited by the context, the term "transaction" may refer to a purchase of goods or services, a withdrawal of funds, an electronic transfer of funds, a payment transaction, a credit transaction, a PIN change transaction or other interaction between a cardholder and the bank maintained a bank account owned by the cardholder. As used herein, a "bank card" refers to a credit card, debit card, ATM card, check card, or the like, and a "bank account" refers to a credit account, debit account, deposit account, checking account, or the like. Although the phrases "bank card" and "bank account" include the term "bank," the card need not be issued by a bank, and the account need not be maintained by a bank and may instead be issued by and/or maintained by other financial institutions.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method of providing customers of a correspondent bank one or more correspondent relationship transactions on an automated teller machine (ATM) network of an ATM bank, the method comprising:
    establishing a relationship between the ATM bank and the correspondent bank whereby customers of the correspondent bank are pre-approved for performing correspondent relationship transactions at an ATM on the ATM network of the ATM bank, where the correspondent relationship transactions would not otherwise be available to a non-customer of the ATM bank; and
    using a computer processor of the ATM operating computer program code instructions stored in a non-transitory computer readable medium, wherein said computer program code instructions are structured to cause said computer processor of the ATM to:
    receive user input requesting initiation of a transaction at the ATM, the transaction involving an account maintained by the correspondent bank;
    initiate authentication of the user as an owner of the account;
    verify that the user is a customer of the correspondent bank and is pre-approved for performing correspondent relationship transactions on the ATM network of the ATM bank, wherein verifying comprises comparing a card routing transit number read from a card of the user to determine if the card routing transit number matches a correspondent bank routing transit number stored in a correspondent bank profile or an individual customer profile;
    communicate, to the user, an option to perform one or more types of correspondent relationship transactions;
    receive user input indicating the user's desire to complete a deposit correspondent relationship transaction and user input regarding the deposit transaction;
    process the deposit transaction user input; and
    communicate a result to the user, the result based on the processed deposit transaction user input.

2. The method of claim 1 further comprising communicating transaction information corresponding to the processed deposit transaction user input to the correspondent bank.

3. The method of claim 1 wherein processing the deposit correspondent relationship transaction comprises processing a check deposit.

4. The method of claim 3 further comprising validating the check to determine whether the check is an acceptable deposit.

5. The method of claim 4 further comprising storing transaction information corresponding to the check and the correspondent relationship transaction.

6. The method of claim 5 wherein the transaction information comprises one or both of image data and magnetic ink character recognition (MICR) data.

7. The method of claim 5 wherein the transaction information comprises one or more of transaction time, transaction date, transaction location.

8. The method of claim 4 further comprising validating a magnetic ink character recognition (MICR) data from the check at a backend system of the ATM bank.

9. The method of claim 1 further comprising storing a correspondent bank profile comprising information regarding the correspondent bank.

10. The method of claim 9 wherein the verifying the user comprises retrieving the information from the correspondent bank profile and comparing customer information with information retrieved from the correspondent bank profile.

11. The method of claim 10 wherein the customer information is provided to the ATM by a customer's bank card.

12. The method of claim 1 further comprising storing an individual customer profile comprising information regarding the correspondent bank.

13. The method of claim 12 wherein the verifying the user comprises retrieving the information from the individual customer profile and comparing customer information with information retrieved from the individual customer profile.

14. The method of claim 13 wherein the customer information is provided to the ATM by a customer's bank card.

15. The method of claim 1 further comprising creating a transaction record based at least in part on transaction information related to the correspondent relationship transaction.

16. The method of claim 15 further comprising decorating the transaction record with additional information related to the transaction.

17. The method of claim 15 wherein the creating the transaction record comprises creating a plurality of transaction records related to a plurality of correspondent relationship transactions, and wherein the method further comprises:
    collecting any transaction records conforming to one or more sweep criteria;
    building a correspondent bank transaction file; and
    delivering the correspondent bank transaction file to the correspondent bank.

18. The method of claim 8 wherein the correspondent bank transaction file includes one or more appended image data files corresponding to one or more checks deposited by one or more correspondent bank customers.

19. The method of claim 17 further comprising charging a correspondent bank demand deposit account a correspondent relationship transaction fee based at least in part on the collected transaction records.

20. A computer program product for providing a customer of a correspondent bank one or more correspondent relationship transactions at an automated teller machine (ATM) on an ATM network of an ATM bank having a pre-existing relationship with the correspondent bank defining the correspondent bank's customer as pre-approved for performing correspondent relationship transactions at the ATM of the ATM bank, the computer program product comprising a non-transitory computer readable memory having computer-executable instructions stored therein, the computer-executable instructions to cause a computer processor of the ATM to implement the steps of:
    receiving user input requesting initiation of a transaction at the ATM, the transaction involving an account maintained by the correspondent bank;
    initiating authentication of the user as an owner of the account;
    verifying that the user is a customer of the correspondent bank and is pre-approved for performing correspondent relationship transactions on the ATM network of the ATM bank, wherein verifying comprises comparing a card routing transit number read from a card of the user to determine if the card routing transit number matches a correspondent bank routing transit number stored in a correspondent bank profile or an individual customer profile;

communicating, to the user, an option to perform one or more types of correspondent relationship transactions;

receiving user input indicating the user's desire to complete a deposit correspondent relationship transaction and user input regarding the deposit transaction;

processing the deposit transaction user input; and communicating a result to the user, the result based on the processed deposit transaction user input.

21. The computer program product of claim 20 wherein the instructions further comprise communicating transaction information corresponding to the processed deposit transaction user input to the correspondent bank.

22. The computer program product of claim 21 wherein the instructions for verifying comprise:

instructions for retrieving the information from the correspondent bank profile and instructions for comparing customer information with information retrieved from the correspondent bank profile.

23. The computer program product of claim 20 wherein the one or more correspondent relationship transactions comprises a check deposit transaction.

24. The computer program product of claim 23 wherein the instructions further comprise instructions for validating the check to determine whether the check is an acceptable deposit.

25. The computer program product of claim 23 wherein the instructions further comprise instructions for storing transaction information corresponding to the check and the correspondent relationship transaction.

26. The computer program product of claim 23 wherein the instructions further comprise instructions for validating a magnetic ink character recognition (MICR) data from the check at a backend system of the ATM bank.

27. The computer program product of claim 20 wherein the instructions further comprise instructions for storing a correspondent bank profile comprising information regarding the correspondent bank.

28. The computer program product of claim 20 wherein the instructions further comprise instructions for creating a transaction record based at least in part on transaction information related to the correspondent relationship transaction.

29. The computer program product of claim 28 wherein the instructions further comprise instructions for decorating the transaction record with additional information related to the transaction.

30. The computer program product of claim 28 wherein the instructions further comprise:

instructions for creating a plurality of transaction records related to a plurality of correspondent relationship transactions;

instructions for collecting any transaction records conforming to one or more sweep criteria;

instructions for building a correspondent bank transaction file; and instructions for delivering the correspondent bank transaction file to the correspondent bank.

31. The computer program product of claim 30 wherein the correspondent bank transaction file includes one or more appended image data files corresponding to one or more checks deposited by one or more correspondent bank customers.

32. The computer program product of claim 30 wherein the instructions further comprise instructions for charging a correspondent bank demand deposit account a correspondent relationship transaction fee based at least in part on the collected transaction records.

33. A system comprising:

an automated teller machine (ATM) configured for providing a customer of a correspondent bank one or more correspondent relationship transactions, the ATM maintained by an ATM bank having a pre-existing relationship with the correspondent bank defining the correspondent bank's customer as pre-approved for performing correspondent relationship transactions at the ATM on an ATM network of the ATM bank, the ATM comprising:

a computer processor operating computer program code instructions stored in a non-transitory computer readable medium, wherein said computer program code instructions are structured to cause said computer processor to:

receive user input requesting initiation of a transaction at the ATM, the transaction involving an account maintained by the correspondent bank;

initiate authentication of the user as an owner of the account;

verify that the user is a customer of the correspondent bank and is pre-approved for performing correspondent relationship transactions on the ATM network of the ATM bank, wherein verifying comprises comparing a card routing transit number read from a card of the user to determine if the card routing transit number matches a correspondent bank routing transit number stored in a correspondent bank profile or an individual customer profile;

communicate, to the user, an option to perform one or more types of correspondent relationship transactions;

receive user input indicating the user's desire to complete a deposit correspondent relationship transaction and user input regarding the deposit transaction;

process the deposit transaction user input; and communicate a result to the user, the result based on the processed deposit transaction user input.

34. The system of claim 33 further comprising:

a backend system disposed remotely from the ATM and connected with the ATM across the ATM network, the backend system configured for storing a correspondent bank profile comprising information regarding the correspondent bank.

35. The system of claim 34 wherein:

the ATM is further configured for retrieving the information from the correspondent bank profile and comparing customer information with information retrieved from the correspondent bank profile.

36. The system of claim 33 wherein the correspondent relationship transaction comprises processing a check deposit, and wherein:

a backend system is further configured for validating the check to determine whether the check is an acceptable deposit.

37. The system of claim 33 wherein:

a backend system is further configured for creating a transaction record based at least in part on transaction information related to the correspondent relationship transaction.

38. The system of claim 37 wherein:

the backend system is further configured for decorating the transaction record with additional information related to the transaction.

39. The system of claim 33 wherein the backend system is further configured for:
- creating a plurality of transaction records related to a plurality of correspondent relationship transactions;
- collecting any transaction records conforming to one or more sweep criteria;
- building a correspondent bank transaction file; and
- delivering the correspondent bank transaction file to the correspondent bank.

* * * * *